Jan. 8, 1929.
M. R. HUTCHISON
1,698,366
METHOD OF PHONOGRAPHIC RECORDING
Filed Nov. 22, 1927
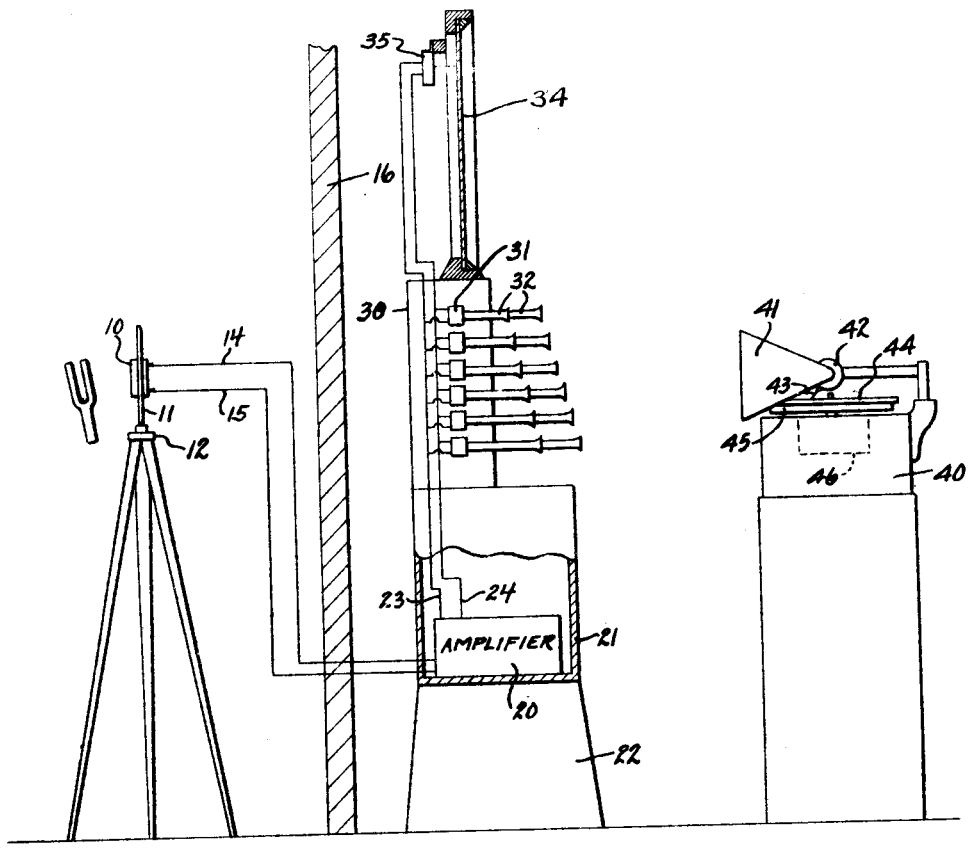
*Miller Reese Hutchison*
INVENTOR.
BY *Albert M Austin*
ATTORNEY Patented Jan. 8, 1929.

1,698,366

UNITED STATES PATENT OFFICE.

MILLER REESE HUTCHISON, OF WEST ORANGE, NEW JERSEY, ASSIGNOR, BY MESNE ASSIGNMENTS, TO ACOUSTIC PRODUCTS COMPANY, OF NEW YORK, N. Y., A CORPORATION OF DELAWARE.

METHOD OF PHONOGRAPHIC RECORDING.

Application filed November 22, 1927. Serial No. 235,093.

The invention relates to a method of and means for producing phonographic records of sound waves.

One object of the invention is to provide an improved method of and means for amplifying sound waves before impressing such waves upon a phonographic record.

Another object of the invention is to provide an improved method of and means for producing phonographic records of sound waves whereby the imperfections of the sound waves to be phonographed will not be permitted to effect the phonographic record.

One feature of the invention relates to the provision of an electrically responsive device adapted to transmit electrical signals in response to sound waves and means for amplifying said signals and reconverting said signals to sound waves before they are phonographed.

Another feature of the invention relates to association with an electrical responsive device for transmitting electric signals in response to sound waves, of an improved means for propagating sound waves in response to the amplified signals transmitted by said electrical device.

Other objects and features will appear from the following description in connection with the accompanying drawings in which The figure of the drawing is a side elevation of one form of apparatus and arrangement thereof for carrying out the present invention.

Like reference characters denote like parts in the several figures of the drawing.

In the following description and claims, parts, characteristic features and functions will be identified by specific means for convenience of expression, but they are intended to be as generic in their application to similar parts or equivalent construction as the art will permit.

Referring to the drawings, an electrical pick-up device 10 is provided, which may be in the form of the usual microphone, as used in radio broadcasting, which is adapted to transmit electrical signals in response to compressional waves impinged thereon. The electrical pick-up device 10 is preferably mounted, for adjustable positioning, within a bifurcated supporting element 11, a detailed view of which is shown at one side of the assembly view. The supporting element 11 is rigidly secured to the upper end of the tripod 12, whereby the position of the pick-up device 10, with respect to the sound propagating source, may be readily adjusted, or moved about. A pair of conductors 14 and 15 are provided, for transmitting electrical signals, produced by the electrical sound pick-up device 10, to a chamber separated from the chamber, in which the original sound waves are produced, by a wall 16, which is preferably of sound proof construction. It will be apparent that, through conductors 14 and 15, electrical signals may be transmitted to any desired distant point, without affecting the remainder of the apparatus involved or method of recording.

For amplifying the electrical signals transmitted by the pick-up device 10, the conductors 14 and 15 are secured to the intake side of an amplifying unit 20, which may be of any preferred design, and which may be housed within a casing, 21, mounted upon a base 22. After the electrical signals, transmitted by the pick-up device 10, in response to sound waves impinged thereon, have been amplified by the amplifying unit 20, they are transmitted therefrom by conductors 23 and 24 to the remainder of the circuit.

For propagating sound waves, in response to the sound waves effecting the pick-up device 10, a sound propagating device 30, which is illustrated as mounted upon the casing 21, is provided. The sound propagating device 30 comprises a plurality of tuned sound propagating units, including sound propagating diaphragms and electromagnetic units mounted within chambers 31, together with a base sound propagating diaphragm 34. To each of the chambers 31 is secured horns 32, each of which is designed to amplify and accentuate sound waves of a predetermined note of the upper portion of the musical register. Thus individual means are provided for propagating the individual notes of the upper portion of the musical register, and the propagation of sound waves of the lower portion of the musical register will be accomplished by the separate sound propagating diaphragm 34, which may be actuated by an electro-magnetic device 35 associated therewith through its connection with conductors 23 and 24.

Thus the sound waves of all portions of the musical register will be propagated without interference and distortion.

For receiving the sound waves propagated by the device 30, and for recording them, a recording instrument 40 is provided, which may be of any desired form, preferably comprising a receiving horn 41, which is adapted to actuate a diaphragm 42, to which is secured a stylus 43, whereby compressional waves received by the diaphragm 42 will cause a corresponding vibration of the stylus 43, which is adapted to pass over a recording platen 44, which is rotated upon a turntable 45 by a motor 46.

In operation, sound waves impinging upon the electrical pick-up device 10, are adapted to propagate electrical signals, through the conductors 14 and 15, in response to the variations of the sound waves impinging. The electrical signals thus transmitted are received by an amplifying device 20, which is preferably positioned at some remote point, such as in a sound proof chamber. The electrical signals thus amplified are delivered through conductors 23 and 24 to a sound propagating device 30, which comprises a plurality of tuned high frequency sound wave propagating units, and a diaphragm for propagating low frequency sound waves. Thus as sound waves of the lower portion of the musical register are impinged upon the electro magnetic pick-up device 10, electrical signals of a low frequency corresponding to the frequency of the sound waves impinging are transmitted to the amplifying unit, where they are amplified before being delivered to the sound propagating device 30. In the sound propagating device 30, the tuned propagating units are actuated in accordance with the electrical signals. That is, when the electrical signals being delivered upon the amplifying unit are of low frequency only the sound propagating diaphragm 34 will propagate sound waves, and vice versa. Thus it may be readily seen that, upon impingement of sound waves of mixed character, such as are propagated by orchestras, the electrical signals transmitted in response to the pick-up device 10, and passing through the amplifier 20, are, in a sense, segregated and classified by the sound propagating unit 30 in such a way that each note is rendered clearly and distinctly without interference with the rendition of notes from other portions of the musical register. It will be also apparent that the sound waves emitted from the propagating unit 30 will retain the natural characteristic technique of the artist propagating the original sound. The sound waves thus propagated by the unit 30 are received and recorded by the unit 40 in the usual maner of sound recording devices.

Thus it will be readily seen that, by use of the present invention, sound waves of increased amplitude, but retaining the original technique and tone color, may be propagated for use in sound recording in response to sound waves propagated by the human voice or by instrument. The invention also provides means for producing sound records of sound waves propagated at points great distances from the recording apparatus.

The invention upon which this application is based, is broader than the specific embodiments shown and described for the purpose of illustrating at least some of the ways in which it may be employed. The scope of the invention is, therefore, to be understood as not being limited by the present specific description. I intend no limitations, other than those imposed by the claims.

What is claimed is:—

1. A method of producing phongraphic records which comprises transmitting electrical signals in response to the sound waves desired to be recorded, propagating sound waves in response to said signals by a plurality of variously tuned sound propagating units, and recording the sound waves thus propagated.

2. Means for producing phonographic records of sound waves comprising means for propagating electrical signals in response to sound waves, means for propagating sound waves in response to said signals, comprising a plurality of tuned sound propagating units, and means for recording said sound waves thus propagated.

3. Means for producing phonographic records of sound waves comprising means for propagating electrical signals in response to sound waves, means for propagating sound waves in response to said signals, comprising a sounding board and a plurality of tuned sound propagating units, and means for recording said sound waves thus propagated.

Signed at New York in the county of New York and State of New York this 21 day of November, A. D. 1927.

MILLER REESE HUTCHISON.